May 8, 1956  O. H. SYMER, JR  2,745,036
RADAR INDICATOR SWEEP DEFLECTION SYSTEM
Filed Oct. 21, 1954  2 Sheets-Sheet 1

May 8, 1956  O. H. SYMER, JR  2,745,036
RADAR INDICATOR SWEEP DEFLECTION SYSTEM
Filed Oct. 21, 1954  2 Sheets-Sheet 2

United States Patent Office 2,745,036
Patented May 8, 1956

2,745,036

RADAR INDICATOR SWEEP DEFLECTION SYSTEM

Orten H. Symer, Jr., Wantagh, N. Y., assignor to Hazeltine Research, Inc., Chicago, Ill., a corporation of Illinois Application October 21, 1954, Serial No. 463,650

6 Claims. (Cl. 315—22)

This invention relates to radar indicator sweep deflection systems and, particularly, to such systems of the type producing closed-center plan-position radar displays.

Radar indicator sweep deflection systems heretofore proposed for producing closed-center plan-position displays also inherently produce a certain amount of undesirable distortion in the portion of the display adjacent the center of the display screen. This distortion is primarily caused by undesirable distortion in the initial portions of the sweep signals which control the electron scanning beam of the display device. Previous efforts to reduce this distortion have been in the direction of utilizing more expensive sweep-signal generator circuits, sweep-signal amplifier circuits, and deflection circuits. Such efforts have not resulted in complete elimination of the distortion and have led to the utilization of more complex and expensive circuitry than is desirable for many applications.

It is an object of the invention, therefore, to provide a new and improved radar indicator sweep deflection system which avoids the foregoing limitations of systems of this type heretofore proposed.

It is another object of the invention to provide a new and improved radar indicator sweep deflection system for eliminating display distortion normally occuring adjacent the center of the display.

It is a further object of the invention to provide a new and improved radar indicator sweep deflection system of relatively inexpensive construction for eliminating display distortion.

Reference is made to copending application Serial No. 463,651, of G. McMillen, entitled "Beam-Scanning System for a Radar Indicator," filed concurrently herewith, wherein there is disclosed and claimed a system related to the present invention.

In accordance with the invention, a radar indicator sweep deflection system comprises a display device including a display screen and means for scanning the display screen with a beam which is periodically unblanked to develop on the display screen the display of target echoes of periodic radar signals. The sweep deflection system also includes circuit means for generating periodic sweep signals inherently having undesirable characteristics during the initial portions thereof and individually starting a predetermined interval prior to the corresponding radar signal to control the scanning beam. The sweep deflection system further includes means for supplying off-centering signals to the display device to enable the scanning beam to start from an off-center position for each scan and pass across the center of the display screen at the end of the predetermined interval. The sweep deflection system additionally includes circuit means for unblanking the display device as the scanning beam crosses over the center of the display screen to enable the device to display the subsequent portion of each scan which is controlled by the later portions of the sweep signals.

For a better understanding of the present invention, together with other and further objects thereof, reference is had to the following description taken in connection with the accompanying drawings, and its scope will be pointed out in the appended claims.

Referring to the drawings.

Figure 1:
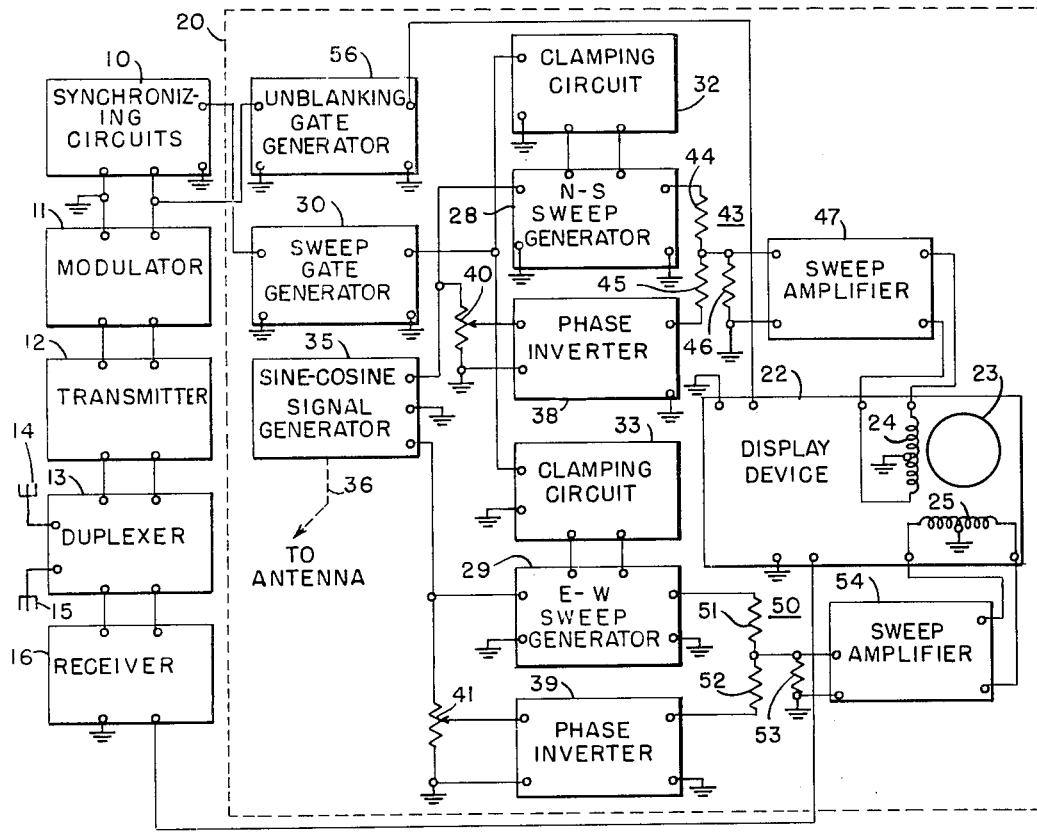
Fig. 1 is a circuit diagram, partly schematic, of a complete radar system including a radar indicator sweep deflection system constructed in accordance with the present invention.

*Description and operation of Fig. 1 radar system*

Referring to Fig. 1 of the drawings, the radar system there represented comprises synchronizing circuits 10 coupled in cascade and in the order named to a modulator 11, a transmitter 12, a duplexer 13, and a rotatable directional antenna system 14, 15. The synchronizing circuits 10 generate timing pulses which are supplied to the modulator 11 which, in response thereto, develops high-potential control pulses which are, in turn, supplied to the transmitter 12. In response to the high-potential pulses from the modulator 11, the transmitter 12 generates bursts or pulses of radio-frequency energy which are supplied through the duplexer 13 to the antenna system 14, 15.

Also coupled to the duplexer 13 and antenna system 14, 15 is a receiver 16 which is effective to derive and amplify the video-frequency components of the radio-frequency radar reply signals intercepted by the antenna system 14, 15. The duplexer 13 enables the antenna system 14, 15 to be used as the receiving antenna while protecting the receiver 16 from the high-power bursts of energy from the transmitter 12. The video-frequency components from the receiver 16 are supplied to a radar indicator sweep deflection system 20 constructed in accordance with the present invention as will be more fully explained hereinafter. The synchronizing circuits 10 are also coupled to the sweep deflection system 20 for supplying suitable timing pulses thereto.

The units 10-16, inclusive, may be of conventional construction and operation so that a detailed description and explanation of the operation thereof are unnecessary herein.

*Description of sweep deflection system of Fig. 1*

Referring again to Fig. 1 of the drawings, there is represented a radar indicator sweep deflection system 20, constructed in accordance with the present invention, comprising a display device 22 including a display screen 23 and a scanning beam for scanning the display screen which is periodically unblanked to develop on the display screen 23 the display of target echoes of periodic radar signals. The display device 22 may also include first and second deflection windings 24 and 25 for enabling the scanning beam to radially scan the display screen 23 to develop a plan-position display of the target echoes thereon. For some types of display devices, for example, those utilizing a rotating deflection yoke, only a single deflection winding may be required.

The sweep deflection system 20 also includes circuit means for generating periodic sweep signals inherently having undesirable characteristics during the initial portions thereof and individually starting a predetermined interval prior to the corresponding radar signal to control the scanning beam of the display device 22. This circuit means may include, for example, first and second sweep-signal generators 28 and 29, of conventional construction, for generating first and second sets of periodic sweep signals. This circuit means may further include circuit means for individually starting the sweep signals a predetermined interval prior to the corresponding radar signals comprising, for example, a sweep gate generator 30, of conventional construction, coupled to the synchronizing circuits 10 and to a clamping circuit 32, of conventional construction, associated with the north-south (N-S) sweep generator 28 and a clamping circuit 33, of conventional construction, associated with the east-west (E-W) sweep generator 29.

The sweep deflection system 20 preferably also includes circuit means for varying the amplitudes of the sweep signals in a sinusoidal manner, the sinusoidal variation of the first set of sweep signals differing in phase from the sinusoidal variation of the second set by 90° to enable successive radial beam scans to progress around the display screen 23 in a circular manner. This circuit means may include, for example, a sine-cosine signal generator 35 for supplying a sine-wave signal to the first sweep-signal generator, for example, the N-S sweep generator 28, and for supplying a cosine-wave signal to the second sweep-signal generator, for example, the E-W sweep generator 29, for varying the amplitudes of the sweep signals developed by the sweep generator 28 in accordance with the sine-wave signal and for varying the amplitudes of the sweep signals developed by the E-W sweep generator 29 in accordance with the cosine-wave signal. The sine-cosine signal generator 35 may include, for example, a conventional direct-current resolver suitably connected as indicated by the dashed line 36 to the rotatable antenna system 14, 15, rotation of one of the windings of the direct-current resolver in accordance with rotation of the antenna system 14, 15 serving to produce in a pair of stator windings of the resolver the desired sine-wave and cosine-wave signals.

The sweep deflection system 20 additionally includes means for supplying off-centering signals to the display device 22 to enable the scanning beam to start from an off-center position for each scan and pass across the center of the display screen 23 at the end of the mentioned predetermined interval. This circuit means may comprise, for example, circuit means for supplying sinusoidal off-centering signals of inverse phase to the sinusoidal amplitude variations of the sets of sweep signals developed by the sweep generators 28 and 29. More specifically, this circuit means may include, for example, first and second phase-inverter circuits 38 and 39, of conventional construction, coupled to the sine-cosine signal generator 35 for respectively developing inverse phase sine-wave and cosine-wave off-centering signals. The amplitude of the signals supplied to the phase inverters 38, 39 may be suitably adjusted by means of voltage dividers 40, 41, respectively, coupled to the input circuits of the phase inverters.

Developing the off-centering signals by utilizing phase inverters 38 and 39 is intended as a representative example only, as several suitable alternatives are readily apparent. For example, some types of sweep generators give the desired phase inversion to the sinusoidal signal applied thereto, that is, the sinusoidal amplitude modulation of the sweep signals developed by such a generator is of inverse phase to the modulating sinusoidal signal supplied thereto. Where sweep generators of this type are utilized, the phase inverters 38 and 39 are not necessary and may be omitted in which case the voltage dividers 40 and 41 may be coupled directly to corresponding adding circuit resistors 45 and 52 which will be explained more fully presently.

The sweep deflection system 20 may also include, for example, first adding circuit means 43 comprising an adding resistor 44 coupled to the first sweep generator 28 and an adding resistor 45 coupled to the first phase-inverter circuit 38 for adding the first set of sweep signals and the inverse-phase sine-wave signal and supplying the combined signals to the first deflection winding 24 of the display device 22. The resistors 44 and 45 are connected to an input resistor 46 of a sweep amplifier 47 which, in turn, is coupled to the deflection winding 24.

The sweep deflection system 20 likewise may include, for example, a second adding circuit 50 which includes an adding resistor 51 coupled to the second sweep generator 29 and an adding resistor 52 connected to the second phase-inverter circuit 39 for adding the second set of sweep signals developed by the generator 29 and the inverse-phase cosine-wave signals developed by the phase inverter 39 and supplying the combined signals to the second deflection winding 25 of the display device 22. The adding resistors 51 and 52 are connected, for example, to an input resistor 53 of a sweep amplifier 54 which, in turn, is coupled to the deflection winding 25.

The sweep deflection system 20 further includes circuit means for unblanking the display device 22 as the scanning beam crosses over the center of the display screen to enable the device 22 to display the subsequent portion of each scan which is controlled by the later portions of the sweep signals. This unblanking circuit means may include, for example, an unblanking gate generator 56 coupled to the display device 22 for supplying periodic unblanking gate signals thereto. The unblanking gate generator 56 is also coupled to the synchronizing circuits 10 for receiving suitable timing pulses therefrom.

Though not shown in Fig. 1, it should be noted that a sweep deflection system in accordance with the present invention is readily adaptable to include provision for the frequently desirable feature of adjustable off-centering of the entire radar scene displayed on the display screen 23. Additionally, the system is readily adaptable to permit display of additional information on the display screen 23 by utilizing time-sharing techniques. In this manner, for example, an electronic cursor might be made to appear on the display screen 23. To utilize either of these features, the proper circuitry could be connected, for example, through additional adding resistors to the input circuits of the sweep amplifiers 47 and 54.

*Operation of sweep deflection system of Fig. 1*

Figure 2:
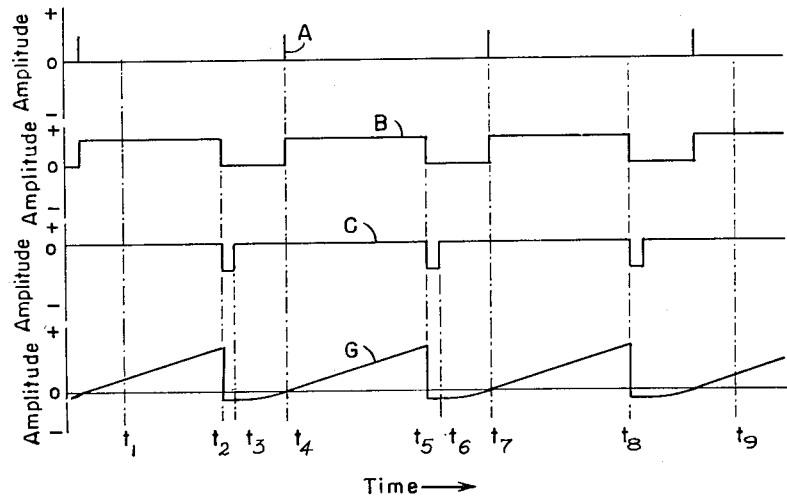
Fig. 2 is a graph representing signals developed at various points of the Fig. 1 sweep deflection system and used in explaining the operation thereof.

Considering now the operation of the sweep deflection system just described, timing pulses from the synchronizing circuits 10 are effective to cause the transmitter 12 to transmit periodic radar signals represented by the periodic pulses of curve A of Fig. 2 occurring, for example, at times $t_4$ and $t_7$. These timing pulses are also supplied to the unblanking gate generator 56 which in response thereto develops periodic unblanking gate signals represented by curve B of Fig. 2 occurring, for example, during the intervals $t_4$–$t_5$ and $t_7$–$t_8$. These unblanking gate signals are supplied to, for example, a control electrode of the display device 22 for periodically unblanking the display device, such as during interval $t_4$–$t_5$, to enable the scanning beam of the device to present a visible trace on the display screen 23.

Figure 3:
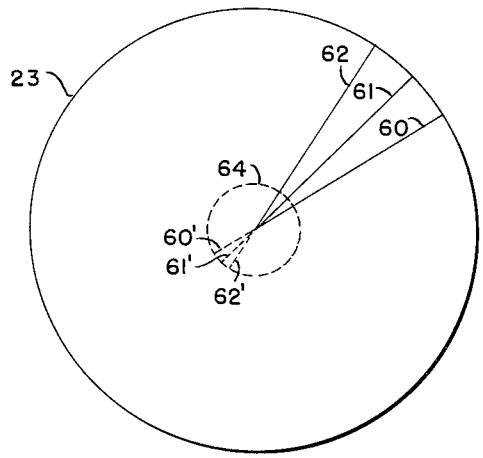
Fig. 3 is a plan view of the display screen of a display device used in the sweep deflection system of Fig. 1.

In conventional radar systems employing plan-position indicators, the scanning beam is periodically caused to scan the display screen 23 in a radial manner, that is, each scan starts at the center of the display screen and sweeps out radially to the edge of the display screen 23 as shown in more detail in the enlarged view of the display screen 23 of Fig. 3. Successive radial beam scans, as indicated by the solid line traces 60, 61, and 62, are caused to progress around the center of the display screen in a circular manner as shown. Each radial scan starts from the center of the display screen at the time of occurrence of one of the transmitted radar pulses represented by curve A of Fig. 2 and reaches the edge of the display screen at a time corresponding to the time required for a target echo to be received from a target at a distance from the radar antenna 14, 15 corresponding to the maximum range under observation. In this manner, as the directional radar antenna rotates, successive beam scans progress or rotate around the center of the display screen in a corresponding manner so that the resulting display represents a map of the surrounding terrain.

As mentioned, in systems heretofore proposed, the display on the display screen 23 has suffered from distortion in the area of the display adjacent the center of the display screen because of distortion in the initial portion of the sweep signals which control the individual beam scans. The Fig. 1 sweep deflection system, constructed in accordance with the present invention, eliminates this distortion by starting each beam scan from an off-center position, passing the beam scan across the center of the display and out to the edge of the display screen, and unblanking the display device as the scanning beam crosses over the center of the display to enable only the subsequent portion of each scan which is controlled by the later distortion-free portion of the sweep signals to be visible on the display screen 23. The start of each beam scan from an off-center position is indicated for the representative scans 60, 61, and 62 of Fig. 3 by the corresponding dashed line traces 60', 61', and 62'. As the display device is blanked during the portion of the traces represented by the dashed line segments, this portion of each beam scan does not appear as a visible indication on the display screen. It is during this invisible portion of each scan that the distored part of each sweep signal occurs so that as a result no distortion is observed in the visible display pattern.

To this end, the sweep gate generator 30, in response to timing pulses from the synchronizing circuits 10, generates periodic sweep gate signals represented by curve C of Fig. 2 occurring, for example, during time intervals $t_3$–$t_5$ and $t_6$–$t_8$ which are supplied to each of the clamping circuits 32 and 33. Each sweep gate signal is effective to cause, for example, the clamping circuit 32 to unclamp the N-S sweep generator 28 to enable that generator to develop a sweep signal of duration corresponding to the duration of the sweep gate signal. The clamping circuit 33 likewise responds to each sweep gate signal to unclamp E-W sweep generator 29 to permit that generator to develop a sweep signal in a similar manner. During the intervals intervening the occurrence of the sweep gate signals, for example, the intervals $t_2$–$t_3$ and $t_5$ $t_6$ of Fig. 2, the clamping circuits 32 and 33 are effective to disable the sweep generators 28 and 29 and establish and maintain potential reference levels at the output terminals of the sweep generators during these intervals to cause the scanning beam of the display device 22 to strike the center of the display screen 23. In the embodiment represented in Fig. 1, these fixed reference levels are essential in order that the visible portion of each beam scan may start from the same position on the display screen 23.

In order to enable the sweep signals to develop a rotating radial scanning pattern on the display screen 23, it is necessary to modulate or vary the amplitudes of the sweep signals developed by the generators 28 and 29 in a sinusoidal manner where the sinusoidal amplitude variations of the sweep signals from one of the sweep generators differ in phase by a factor of 90° from the sinusoidal amplitude variations of the sweep signals developed by the other sweep generator. To this end, the sine-cosine signal generator 35 supplies to the N-S sweep generator 28, for example, a sine-wave signal represented by curve D of Fig. 4. This sine-wave signal is effective to control the amplitudes of the individual sweep signals produced by the sweep generator 28 to produce at the output terminals of generator 28 a set of sine-wave modulated sweep signals represented by curve E of Fig. 4. It will be noted that the envelope of the amplitude variations of the sweep signals, which envelope is represented by curve D', corresponds to the sine wave of curve D. The zero level of curve E represents the reference level which is precisely maintained by the clamping circuit 32.

Figure 4:
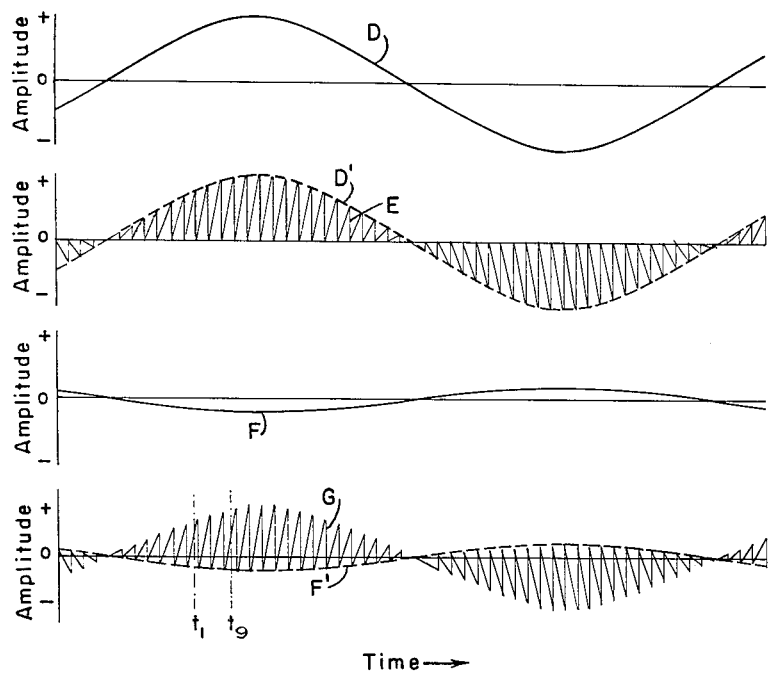
Fig. 4 is another graph representing signals developed at various points of the Fig. 1 sweep deflection system.

In a similar manner, a cosine-wave signal is supplied to, for example, the E-W sweep generator 29 to produce at the output terminals thereof a set of cosine-wave modulated sweep signals having amplitude variations similar to those represented by curve E of Fig. 4 except that the peak-amplitude variation of the envelope is shifted by one-quarter of a sine-wave cycle with respect to the peak-amplitude of the envelope of the sweep signals of curve E.

The sets of sinusoidally modulated sweep signals from the sweep generators 28 and 29 are supplied through the corresponding adding circuits 43 and 50 to the corresponding sweep amplifiers 47 and 54 which, in turn, are connected to the corresponding deflection windings 24 and 25 to produce the rotating radial scanning pattern on the display screen 23. Because the sine-cosine signal generator 35 is properly synchronized with the rotation of the directional antenna system 14, 15, each scan of the scanning beam of the display device 22 corresponds to a given angular direction of the antenna system. Each cycle of, for example, the sine-wave signal represented by curve D corresponds to a complete revolution of the antenna system 14, 15. The number of sweep signals per cycle depends on the quality of the display desired and may be, for example, of the order of 3000 sweeps per sine-wave cycle for an antenna speed of 6 revolutions per minute. The number of sweeps per cycle shown by curve E of Fig. 4 is, for convenience of explanation, less than customary.

In order to start the individual beam scans from an off-center position, it is necessary to supply suitable off-centering signals to the deflection windings 24 and 25. In order that the off-centering position may rotate in accordance with the rotation of the scanning trace, it is necessary that these off-centering signals have sinusoidal variations of the same frequency as the sinusoidal modulation of the sweep signals. As the off-center starting position of each trace is to be located on an opposite side of the center from the visible portion of each trace, it is necessary that the off-centering signals be of inverse polarity or inverse phase to that of the sinusoidal variations of the sweep signals.

One system for developing and supplying to the display device 22 the required off-centering signals is illustrated in Fig. 1 of the drawings. As shown, the sine-wave signal used to control the amplitude variations of, for example, the sweep generator 28 is also supplied to the phase inverter 38 through a voltage divider 40. The signal produced at the output terminals of the phase inverter 38 is represented by curve F of Fig. 4 and is supplied through the adding resistor 45 to the sweep amplifier 47. As a result of addition of this off-centering signal to the sine-wave modulated sweep signals supplied by the sweep generator 28, the wave form of the resulting signal at the input terminals of the sweep amplifier 47 is as represented by curve G of Fig. 4. It will be noted that the starting point of each of the sweeps has been shifted with respect to the reference level in accordance with the amplitude of the inverse-phase off-centering signal as indicated by the lower envelope F' of the sweep signals represented by curve G.

The portion of the resulting signal represented by curve G occurring in the time interval $t_1$–$t_9$ of Fig. 4 is shown in more detail by curve G of Fig. 2. It will be noted that the amplitude variations of the sweep signals corresponding to the envelopes D' and F' of Fig. 4 may not be discernible in curve G of Fig. 2 because of the expansion of the time scale thereof and the smallness of the variation. As the zero reference level of curve G of Fig. 2 represents the signal level required for the deflection winding 24 to cause the scanning beam to strike the center of the display screen 23, it will be seen that, as far as deflection winding 24 is concerned, each of the sweeps now starts from a point with respect to the reference level such that each of the beam scans will start from an off-center position on a side opposite the visible portion of each scan. To obtain the proper starting position for each scan, an inverse-phase cosine-wave signal of the same amplitude as the inverse-phase sine-wave signal of curve F must be added to the cosine-wave modulated sweep signals from the E-W sweep generator 29 in the same manner as was done for the sine-wave modulated sweep signals from the N-S sweep generator 28.

The amount by which each scan starts from an off-center position is indicated by the radius of the dash-line circle 64 shown on the face of the display screen 23 of Fig. 3. The amount of initial off-centering may be adjusted by adjusting the amplitude of the inverse-phase off-centering signals supplied by the phase inverters 38 and 39. This adjustment is made by means of the adjustable voltage dividers 40 and 41. The amount by which the starting position is off-centered should be such that the time required for the scanning beam to pass from the starting position to the center of the display corresponds to the predetermined time interval by which the sweep signals are started prior to the corresponding radar pulses. In order to eliminate the distortion present in the initial portion of each sweep, this time interval may be, for example, of the order of four times the time constant of the deflection windings which may be, for example, of the order of 100 microseconds.

It is to be understood that the term "center of the display screen" is not necessarily limited to mean the physical center of the display screen 23, but rather means the center of the radar scene corresponding to the location of the radar antenna. This distinction is important because it is frequent practice in present-day radar systems to provide means for off-centering the entire radar scene displayed on the display device in order to afford a more desirable presentation of events occurring at the edge of the radar scene.

From the foregoing description of the invention it will be apparent that a radar indicator sweep deflection system constructed in accordance with the present invention represents an improved sweep deflection system for eliminating display distortion without need for recourse to complex circuitry.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A radar indicator sweep deflection system comprising: a display device including a display screen and means for scanning the display screen with a beam which is periodically unblanked to develop on the display screen the display of target echoes of periodic radar signals; circuit means for generating periodic sweep signals inherently having undesirable characteristics during the initial portions thereof and individually starting a predetermined interval prior to the corresponding radar signal to control said scanning beam; means for supplying off-centering signals to said display device to enable said scanning beam to start from an off-center position for each scan and pass across the center of said display screen at the end of said predetermined interval; and circuit means for unblanking said display device as said scanning beam crosses over the center of said display screen to enable the device to display the subsequent portion of each scan which is controlled by the later portions of said sweep signals.

2. A radar indicator sweep deflection system comprising: a display device including a display screen and means for scanning the display screen with a beam which is periodically unblanked to develop on the display screen the display of target echoes of periodic radar signals; a pair of sweep-signal generators for generating periodic sweep signals inherently having undesirable characteristics during the initial portions thereof to control said scanning beam; circuit means for individually starting said sweep signals a predetermined interval prior to the corresponding radar signal; means for supplying off-centering signals to said display device to enable said scanning beam to start from an off-center position for each scan and pass across the center of said display screen at the end of said predetermined interval; and circuit means for unblanking said display device as said scanning beam crosses over the center of said display screen to enable the device to display the subsequent portion of each scan which is controlled by the later portions of said sweep signals.

3. A radar indicator sweep deflection system comprising: a display device including a display screen and means for radially scanning the display screen with a beam which is periodically unblanked to develop on the display screen a plan-position display of target echoes of periodic radar signals; a pair of sweep-signal generators for generating first and second sets of periodic sweep signals inherently having undesirable characteristics during the initial portions thereof and individually starting a predetermined interval prior to the corresponding radar signal to control said scanning beam; circuit means for varying the amplitudes of said sweep signals in a sinusoidal manner, the sinusoidal variation of said first set differing in phase from the sinusoidal variation of said second set by 90° to enable successive radial beam scans to progress around the display screen in a circular manner; means for supplying off-centering signals to said display device to enable said scanning beam to start from an off-center position for each scan and pass across the center of said display screen at the end of said predetermined interval; and circuit means for unblanking said display device as said scanning beam crosses over the center of said display screen to enable the device to display the subsequent portion of each scan which is controlled by the later portions of said sweep signals.

4. A radar indicator sweep deflection system comprising: a display device including a display screen and means for radially scanning the display screen with a beam which is periodically unblanked to develop on the display screen a plan-position display of target echoes of periodic radar signals; a pair of sweep-signal generators for generating first and second sets of periodic sweep signals inherently having undesirable characteristics during the initial portions thereof and individually starting a predetermined interval prior to the corresponding radar signal to control said scanning beam; circuit means for varying the amplitudes of said sweep signals in a sinusoidal manner, the sinusoidal variation of said first set differing in phase from the sinusoidal variation of said second set by 90° to enable successive radial beam scans to progress around the display screen in a circular manner; circuit means for supplying sinusoidal off-centering signals of inverse phase to the sinusoidal amplitude variations of said sets of sweep signals to said display device to enable said scanning beam to start from an off-center position for each scan and pass across the center of said display screen at the end of said predetermined interval; and circuit means for unblanking said display device as said scanning beam crosses over the center of said display screen to enable the device to display the subsequent portion of each scan which is controlled by the later portions of said sweep signals.

5. A radar indicator sweep deflection system comprising: a display device including a display screen and means for scanning the display screen with a beam which is periodically unblanked to develop on the display screen the display of target echoes of periodic radar signals; circuit means for generating periodic sweep signals inherently having undesirable characteristics during the initial portions thereof and individually starting a predetermined interval prior to the corresponding radar signal to control said scanning beam; means for supplying off-centering signals to said display device to enable said scanning beam to start from an off-center position for each scan and pass across the center of said display screen at the end of said predetermined interval; and an unblanking gate generator for supplying periodic unblanking gate signals for unblanking said display device as said scanning beam crosses over the center of said display screen to enable the device to display the subsequent portion of each scan which is controlled by the later portions of said sweep signals.

6. A radar indicator sweep deflection system comprising: a display device including a display screen, first and second deflection windings, and means for radially scanning the display screen with a beam which is periodically unblanked to develop on the display screen a plan-position display of target echoes of periodic radar signals; first and second sweep-signal generators for generating first and second sets of periodic sweep signals inherently having undesirable characteristics during the initial portions thereof and individually starting a predetermined interval prior to the corresponding radar signal to control said scanning beam; a sine-cosine signal generator for supplying a sine-wave signal to said first sweep-signal generator and a cosine-wave signal to said second sweep-signal generator for varying the amplitudes of the sweep signals of said first and second sets in a properly related sinusoidal manner to enable successive radial beam scans to progress around the display screen in a circular manner; first and second phase-inverter circuits coupled to said sine-cosine signal generator for respectively developing inverse-phase sine-wave and cosine-wave off-centering signals to enable said scanning beam to start from an off-center position for each scan and pass across the center of said display screen at the end of said predetermined interval; first adding circuit means coupled to said first sweep-signal generator and said first phase-inverter circuit for adding said first set of sweep signals and said inverse-phase sine-wave signal and supplying the combined signal to said first deflection winding; second adding circuit means coupled to said second sweep-signal generator and said second phase-inverter circuit for adding said second set of sweep signals and said inverse-phase cosine-wave signal and supplying the combined signal to said second deflection winding; and circuit means for unblanking said display device as said scanning beam crosses over the center of said display screen to enable the device to display the subsequent portion of each scan which is controlled by the later portions of said sweep signals.

References Cited in the file of this patent

UNITED STATES PATENTS

| | | |
|---|---|---|
| 2,222,943 | George | Nov. 26, 1940 |
| 2,313,966 | Poch | Mar. 16, 1943 |
| 2,386,728 | Theisen | Oct. 9, 1945 |
| 2,395,966 | Goldberg | Mar. 5, 1946 |
| 2,406,970 | Smith | Sept. 3, 1946 |
| 2,540,087 | Barchok et al. | Feb. 6, 1951 |